(12) United States Patent
Manning

(10) Patent No.: US 10,660,477 B1
(45) Date of Patent: May 26, 2020

(54) SPATULA STAND

(71) Applicant: Mark Manning, Orange, CA (US)

(72) Inventor: Mark Manning, Orange, CA (US)

( * ) Notice: Subject to any disclaimer, the term of this patent is extended or adjusted under 35 U.S.C. 154(b) by 0 days.

(21) Appl. No.: 16/128,074

(22) Filed: Sep. 11, 2018

Related U.S. Application Data

(60) Provisional application No. 62/558,700, filed on Sep. 14, 2017, provisional application No. 62/571,526, filed on Oct. 12, 2017.

(51) Int. Cl.
| | | |
|---|---|---|
| *A47G 29/00* | (2006.01) | |
| *A47J 45/02* | (2006.01) | |
| *A47G 29/087* | (2006.01) | |

(52) U.S. Cl.
CPC ............ *A47J 45/02* (2013.01); *A47G 29/087* (2013.01)

(58) Field of Classification Search
CPC ....... A47G 21/14; A47G 21/145; A47J 47/16; A47J 43/287; A47J 43/28
USPC ....................... 248/37.3, 37.6; 211/70.6, 70.7
See application file for complete search history.

(56) References Cited

U.S. PATENT DOCUMENTS

| | | | |
|---|---|---|---|
| 1,661,787 A * | 3/1928 | Chisholm .............. | A47G 21/14 248/37.3 |
| 2,323,296 A | 7/1943 | Brown | |
| D177,478 S | 4/1956 | Marchion | |
| 2,919,086 A | 12/1959 | McMahan | |
| D387,232 S * | 12/1997 | Lloyd-Morris ................ | D6/553 |
| D430,087 S | 8/2000 | Schumacher | |
| D455,590 S | 4/2002 | Short | |
| D465,746 S | 11/2002 | Mangini et al. | |
| 6,505,746 B1 * | 1/2003 | Johnson .................. | A47J 47/16 211/70.7 |
| 6,626,303 B1 * | 9/2003 | Moodie ................. | A47F 5/0807 211/70.7 |
| 6,792,960 B2 * | 9/2004 | Peele ..................... | A45D 27/46 134/104.2 |
| 7,267,308 B1 * | 9/2007 | Jenson ..................... | A47J 47/16 211/181.1 |
| D579,729 S * | 11/2008 | Pourounidis ................... | D7/637 |
| D773,957 S | 12/2016 | Greer | |
| 10,226,143 B1 * | 3/2019 | Oser ....................... | A47G 21/14 |
| 2012/0069696 A1 * | 3/2012 | Van Geer ................. | B44D 3/06 366/129 |
| 2015/0108286 A1 * | 4/2015 | Barnes .................. | A47J 43/287 248/37.6 |

* cited by examiner

*Primary Examiner* — Steven M Marsh
(74) *Attorney, Agent, or Firm* — Sandy Lipkin

(57) ABSTRACT

A stand to securely hold spatulas wherein the stand has a base that is magnetically secured to metal surfaces and includes a concave basin for the collection of grease when a greasy metal spatula is placed thereatop. On the distal end of the basin from the abutment where the handle of a spatula rests is a lip/shelf that provides a slot for the placement therein of the flat portion of a metal spatula and magnets are included directly therebelow to keep a metallic spatula magnetically secured in place. An abutment portion attached to the concave basin provides a slot for the handle of the spatula to rest thereon.

8 Claims, 6 Drawing Sheets

SPATULA STAND

REFERENCE TO PRIOR APPLICATION

This application claims priority of the provisional patent application 62/558,700, filed Sep. 14, 2017 entitled SPATULA STAND by Mark Manning and provisional patent application 62/571,526 filed Oct. 12, 2017 entitled SPATULA STAND by Mark Manning.

BACKGROUND OF THE INVENTION

Field of the Invention

The present invention relates generally to the field of cooking utensils, and more particularly toward a stand on which to place a spatula that secures the spatula thereto as well as securing the stand itself to metallic surfaces wherein the stand collects grease in a concave basin.

Description of the Prior Art

When barbecuing meat or even working in the kitchen, the spatula is the cooking tool used to turn meat and other food items. When barbecuing and in grilling in the kitchen, especially when cooking meats, the spatula collects grease. When the spatula is placed down on the barbecue or kitchen counter, the grease is transferred to that surface.

In the case of barbecuing the result is that the barbecue gets greasy. Simple solutions are used that include putting down a paper plate for the spatula, but just one time forgetting gets the grease on the surface. Furthermore, a paper plate can blow away in the wind and is overall ineffective for this purpose.

It is the object of the instant invention to provide a stand for a spatula to catch the grease that is securable to the barbecue or other kitchen surface.

SUMMARY OF THE INVENTION

The preferred embodiment of the present invention teaches a stand for a spatula comprising: a base having a perimeter; a collection basin for the collection of grease on said spatula, said basin being located in the center of said base defined by said perimeter; a shelf providing a slot for the placement thereon of the flat portion of said spatulate that is located in said collection basin on one side of said base; a magnet located on the underside of said base positioned directly below said shelf; an abutment attached to said concave basin on the distal end from said shelf that is raised at an angle to secure the handle of a spatula thereon; and a plurality of magnets being attached along said underside of said base to secure said base to a magnetic surface.

The above embodiment can be further modified by defining that said perimeter of said base is magnetized.

The above embodiment can be further modified by defining that said collection basin is concave.

The above embodiment can be further modified by defining that said abutment is magnetized.

An alternate embodiment of the instant invention provides for a method of using a spatula and keeping cleaning surfaces free of grease comprising the steps of: acquiring a spatula for the flipping of greasy food items said spatula having a flat portion and a handle portion; acquiring a metallic surface as a cooking area; acquiring a stand for said metal spatula, said stand further comprising: a base having a perimeter; a collection basin for the collection of grease on said spatula, said basin being located in the center of said base defined by said perimeter; a shelf providing a slot for the placement thereon of the flat portion of said spatulate that is located in said collection basin on one side of said base; a magnet located on the underside of said base positioned directly below said shelf; an abutment attached to said concave basin on the distal end from said shelf that is raised at an angle to secure the handle of a spatula thereon; and a plurality of magnets being attached along said underside of said base to secure said base to a magnetic surface; placing said stand on a metallic surface; using said spatula to turn meat and other greasy food items on a cooking apparatus; placing said spatula with grease thereon on said stand, said flat portion of said spatula resting along said perimeter of said stand and said handle portion of said spatula resting on said abutment.

The above embodiment can be further modified by defining that said perimeter of said base is magnetized.

The above embodiment can be further modified by defining that said collection basin is concave.

The above embodiment can be further modified by defining that said abutment is magnetized.

DETAILED DESCRIPTION OF A PREFERRED EMBODIMENT

Figure 1:
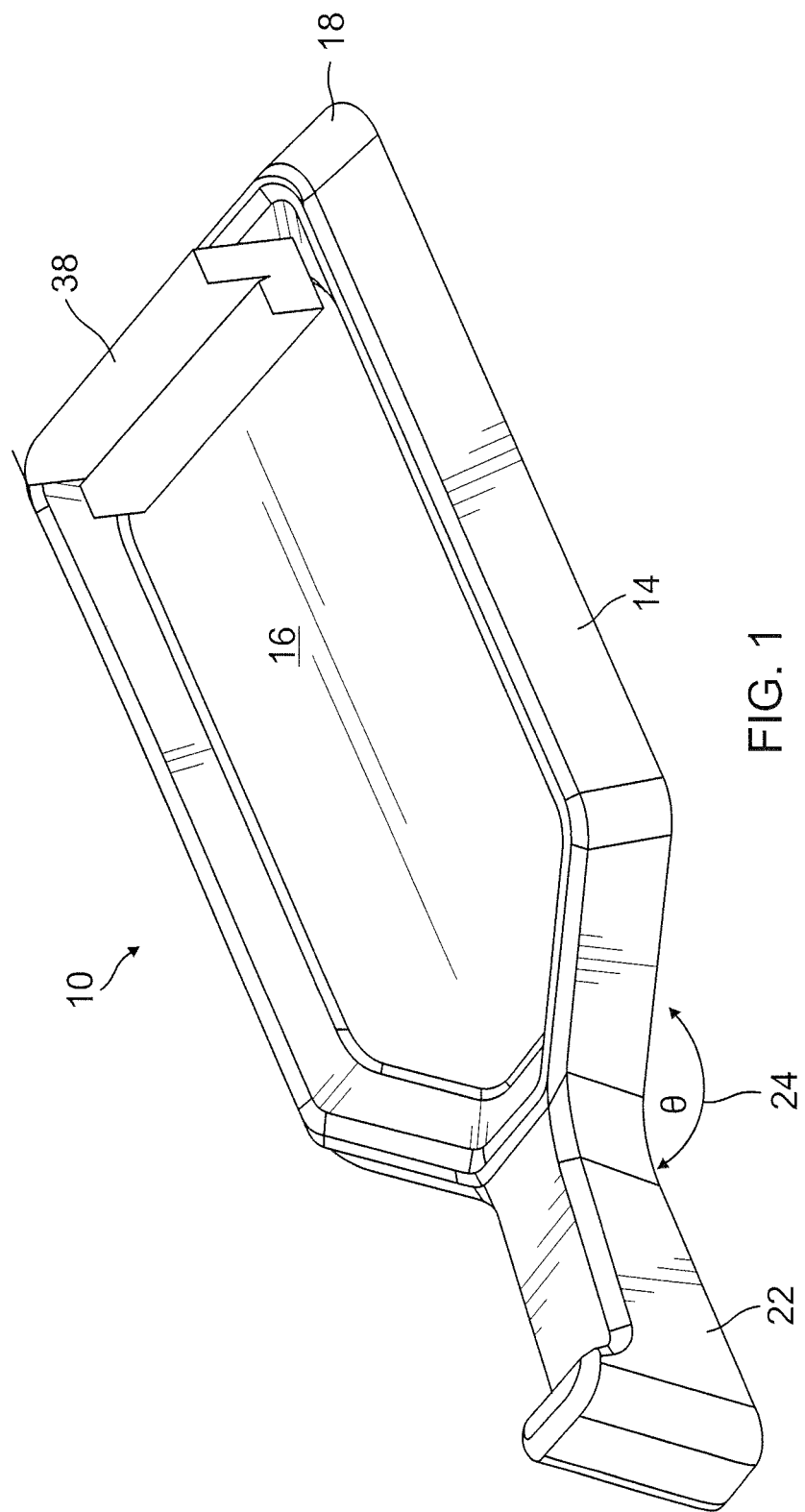
FIG. 1 is a top perspective view of the spatula stand of the instant invention.

Turning to the drawings, the preferred embodiment is illustrated and described by reference characters that denote similar elements throughout the several views of the instant invention.

The preferred embodiment of the instant invention is illustrated in detail in FIGS. 1-6. The instant invention provides for a stand 10 for a spatula 12 that has a base 14 that is outfitted with a plurality of magnets 30 on the bottom face 36 so that it can be secured to any metallic surface near the cooking area, such as a barbecue shelf or stovetop. Atop the base 14 is a concave basin 16 that collects any dripped grease. The perimeter 18 of the basin is raised and can be magnetic to allow for a metal spatula 12 to be secured thereto when placed thereon and leaving space 20 between the perimeter 18 and the concave basin 16 for grease to drip therethrough. In the preferred embodiment, there is a shelf/lip 38 on the end of the concave basin 16 where the flat portion 32 of a spatula 12 can rest and stay secured thereto. In the case of a metal spatula 12, there are a series of magnets 34 on the bottom face 36 of the base 14 that positioned directly below the lip/shelf 38 to magnetically secure the flat portion 28 of a spatula 12 while providing space 20 between the flat portion 28 of a spatula 12 and the concave basin 16. On the opposite end of the basin 16 from the shelf/lip 38 is an abutment 22 elevated at an angle 24 above the concave basin 16 specifically shaped to hold the handle 26 of the spatula 12. This abutment 22 could be magnetized as well to secure a metal handle 26 of a spatula 12.

Figure 2:
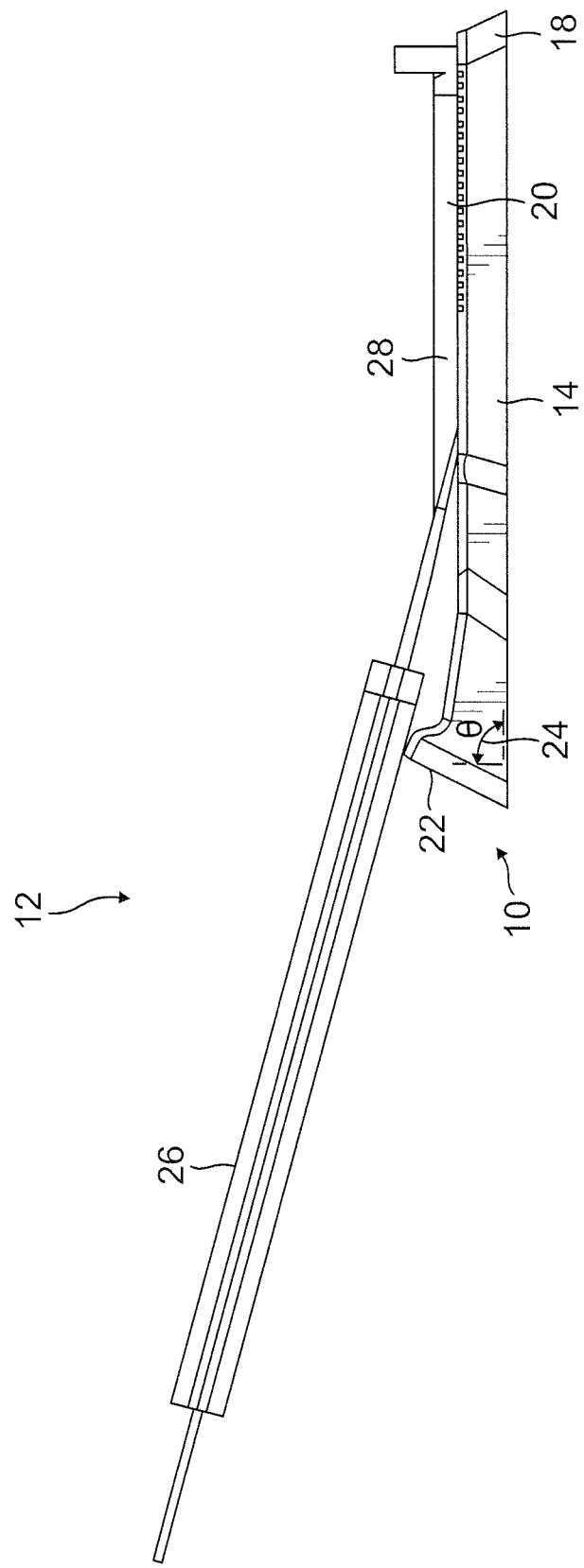
FIG. 2 is a side view of the spatula stand of the instant invention.
Figure 3:
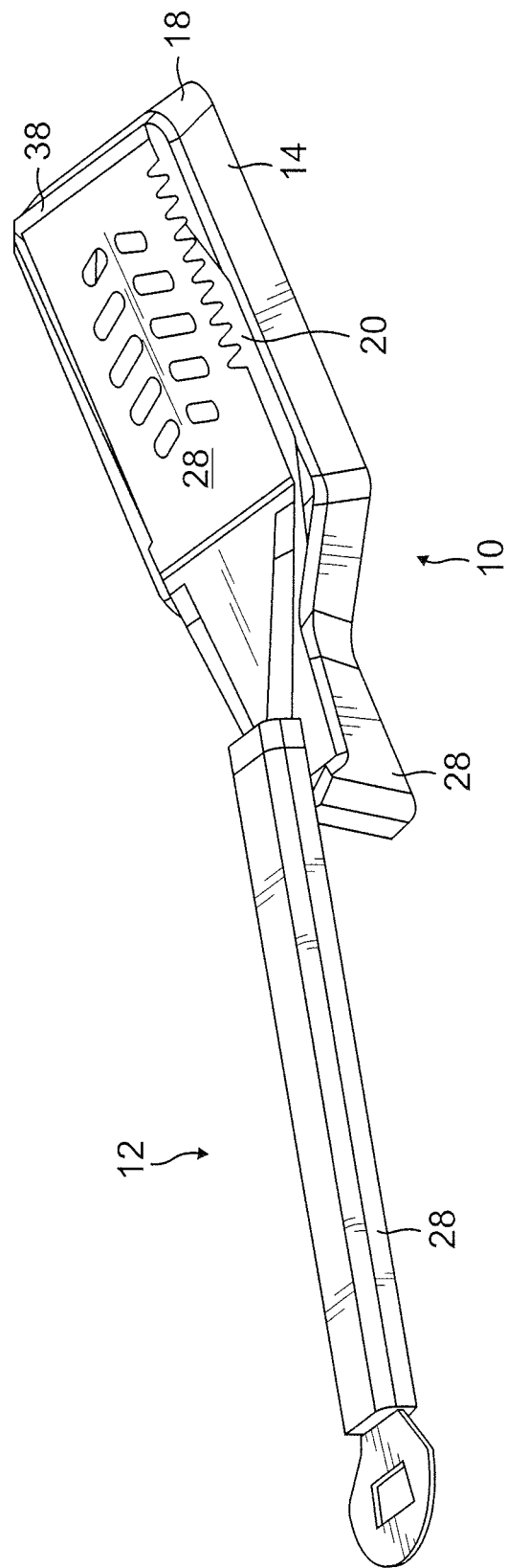
FIG. 3 is a top perspective view of the spatula stand of the instant invention with a spatula resting thereon.

FIGS. 1 and 3 show top perspective views of the stand 10 both without (FIG. 1) and with (FIG. 3) a spatula 12 resting thereon. The stand 10 has a base 14 that is substantially shaped like the flat portion 28 of a spatula 12 but it is understood that it could take any decorative shape that would still function as intended. The base 14 includes in the center a concave basin 16 that collects grease that may drip from the flat portion 28 of the spatula 12. The base 14 has a perimeter 18 that defines the concave basin 16 and could be magnetized as well to keep a metal spatula 12 in place once placed thereon. In the preferred embodiment, the flat portion 28 of the spatula 12 is magnetic, rests on the lip/shelf 38 and is magnetically secured in place by the magnet or magnets 32 situated directly below the lip/shelf 38 on the bottom face 36 of the base 14. Connected to the base 14 is an abutment 22 that is elevated at an angle 24 that substantially matches the angle on the spatula 12 from the flat portion 28 to the handle 26. The abutment 22 likewise can be magnetized to allow for the handle 26 of a metal spatula 12 to stay in placed once placed thereon. FIG. 2 illustrates a side view as the spatula 12 in placed on top of the stand 10.

Figure 4:
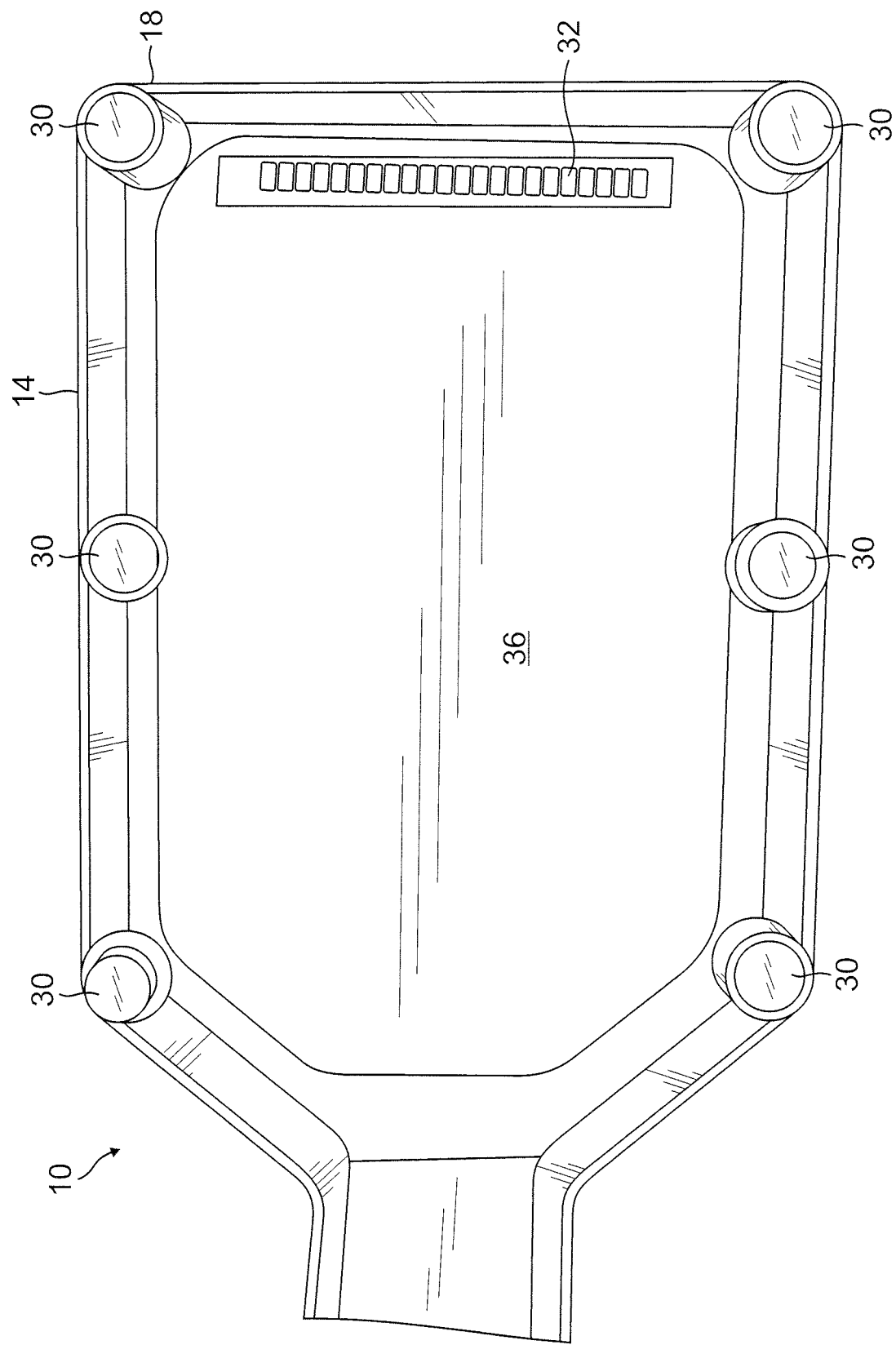
FIG. 4 is a bottom view of the spatula stand of the instant invention.

FIG. 4 illustrates the bottom of the stand 10. Along the perimeter 18 of the base 14 are a plurality of magnets 30 that provide stability in that they secure the stand 10 to a barbecue, stovetop or other magnetic surface so that the stand 10 will not fall off or blow away in wind. Additionally, these magnets 30 provides a means for storing the stand 10 when not in use on any convenient metallic surface, such as the vertical side of a stove or barbecue.

Figure 5:
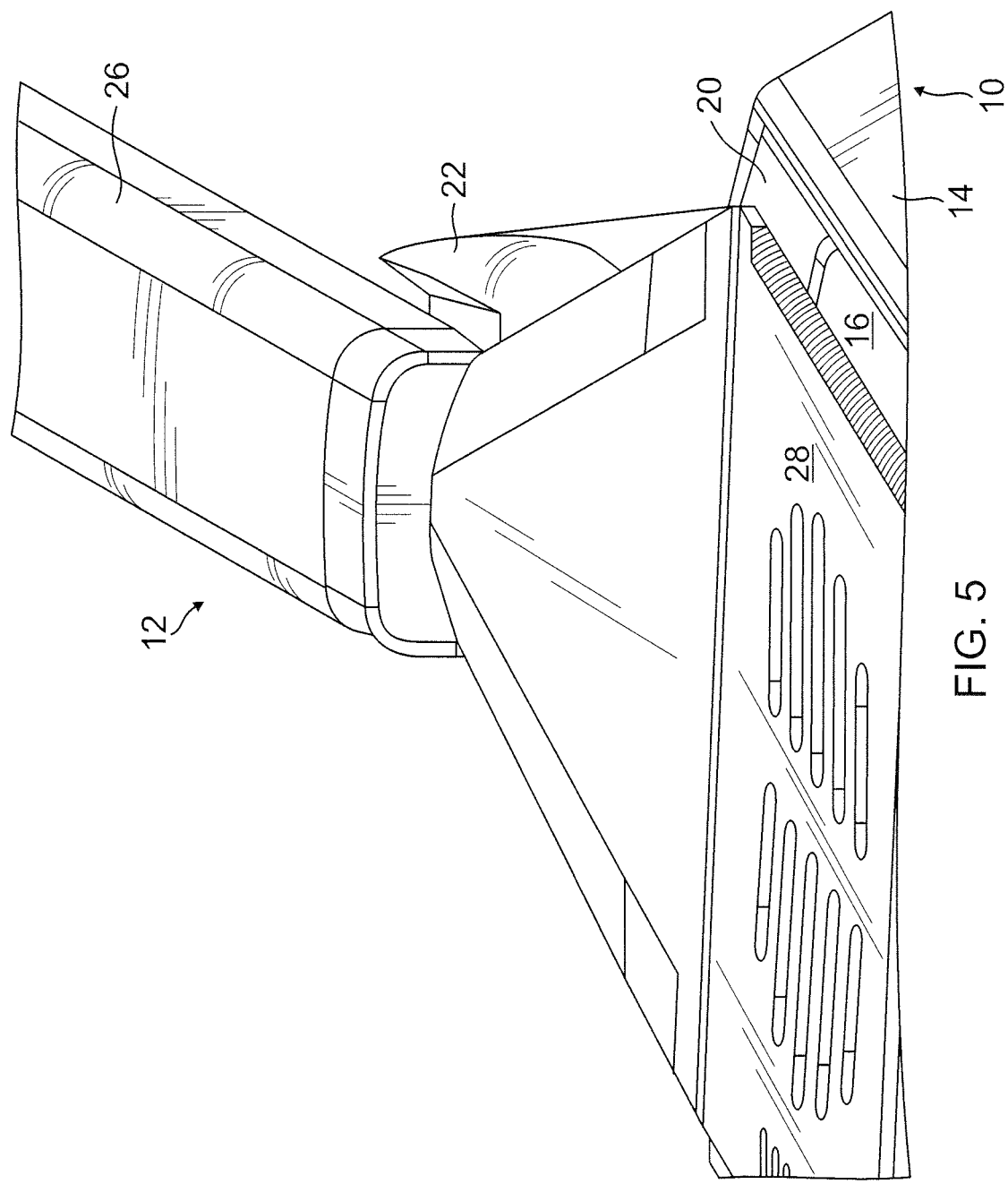
FIG. 5 is a close up view of the section of the spatula stand of the instant invention where the handle of the spatula rests.
Figure 6:
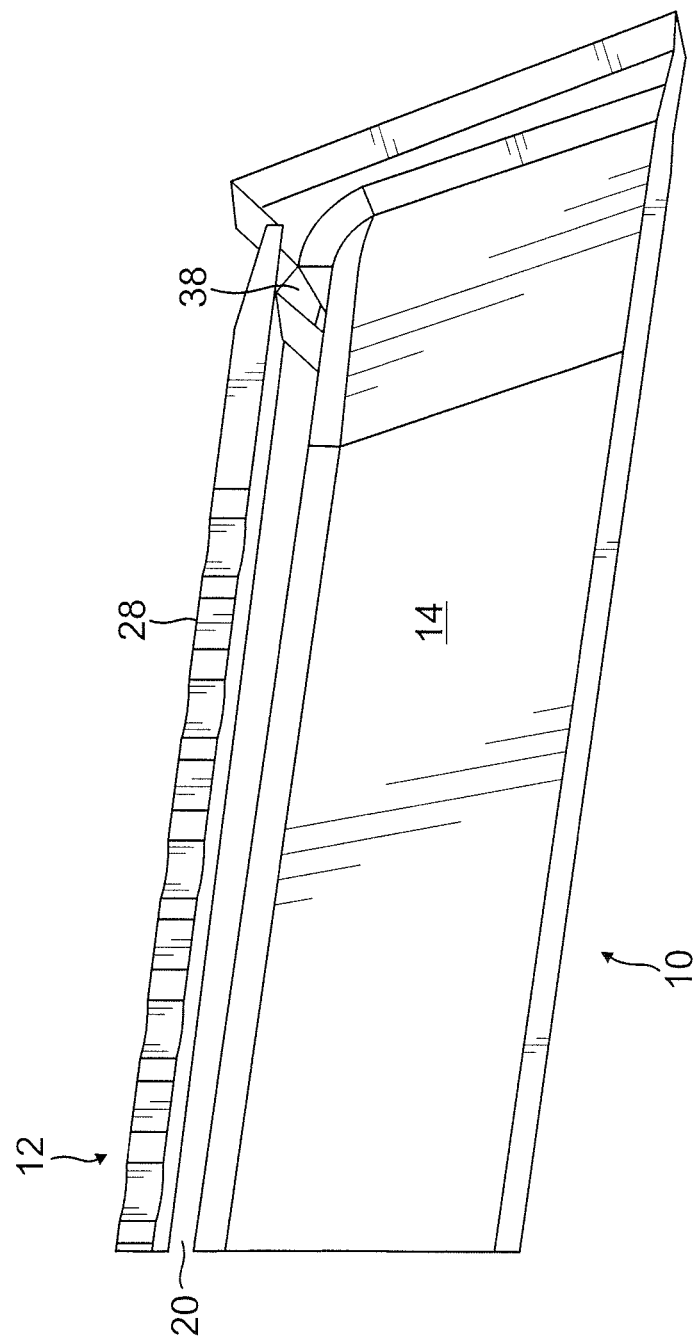
FIG. 6 is a close up view of the section of the spatula stand of the instant invention where the flat portion of the spatula rests.

FIGS. 5-6 show close up views of the two sections of the stand 10. In FIG. 5 the portion near where the spatula handle 26 rests is shown where the connection between the handle 26 and the abutment 22 can be seen as well as the space 20 between the flat portion 28 of the spatula 12 where grease can drip therefrom and into the concave basin 16 FIG. 6 shows the portion of the stand 10 where the flat portion 28 of the spatula 12 rests which includes a lip/shelf 38 in the base 14 into which the flat portion 28 of the spatula 12 can fit into and is secured thereon through the lip/shelf 38 through the magnet 32 located directly below on the bottom face 36 of the base 14. (See FIG. 4).

While the magnet 32 on the bottom face 36 of the base 14 provides a means for magnetically securing a metal spatula 14, it is to be understood that a plastic spatula 12 could also benefit from the features of the instant invention in that there is a place in the concave basin 16 to collect the grease and the stand will stay secure wherever it is placed provided it is placed on a metallic surface.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives that are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A stand for a spatula comprising:
   a base having a perimeter;
   a concave collection basin for the collection of grease on said spatula, said basin being located in a center portion of said base defined by said perimeter;
   a shelf providing a slot for the placement thereon of a flat portion of a spatula that is located in said collection basin on one side of said base wherein said shelf has a base that sits atop and above said concave collection basis thereby providing a space between said base and said concave collection basin;
   a magnet located on an underside of said base positioned directly below said shelf;
   an abutment attached to said concave basin on a distal end from said shelf that is raised at an angle to secure a handle of a spatula thereon;
   a plurality of magnets being attached along said underside of said base to secure said base to a magnetic surface.

2. The stand as defined in claim 1 wherein said perimeter of said base is magnetized.

3. The stand as defined in claim 1 wherein said collection basin is concave.

4. The stand as defined in claim 1 wherein said abutment is magnetized.

5. A method of using a spatula and keeping cleaning surfaces free of grease comprising the steps of:
   acquiring a spatula for the flipping of greasy food items said spatula having a flat portion and a handle portion;
   acquiring a metallic surface as a cooking area;
   acquiring a stand for said metal spatula, said stand further comprising:
      a base having a perimeter;
      a concave collection basin for the collection of grease on said spatula, said basin being located in a center portion of said base defined by said perimeter;
      a shelf providing a slot for the placement thereon of a flat portion of a spatula that is located in said collection basin on one side of said base wherein said shelf has a base that sits atop and above said concave collection basis thereby providing a space between said base and said concave collection basin;

a magnet located on an underside of said base positioned directly below said shelf;

an abutment attached to said concave basin on a distal end from said shelf that is raised at an angle to secure a handle of a spatula thereon; and a plurality of magnets being attached along said underside of said base to secure said base to a magnetic surface;

placing said stand on a metallic surface;

using said spatula to turn meat and other greasy food items on a cooking apparatus;

placing said spatula with grease thereon on said stand, said flat portion of said spatula resting along said perimeter of said stand and said handle portion of said spatula resting on said abutment.

6. The method as defined in claim 5 wherein said perimeter of said base is magnetized.

7. The method as defined in claim 5 wherein said collection basin is concave.

8. The stand as defined in claim 5 wherein said abutment is magnetized.

\* \* \* \* \*